United States Patent
Qiao

(10) Patent No.: US 7,869,088 B2
(45) Date of Patent: Jan. 11, 2011

(54) METHODS AND APPARATUS FOR DETERMINING A LOOKUP TABLE SIZE FOR AN AFP LINK CMR

(75) Inventor: Yue Qiao, Longmont, CO (US)

(73) Assignee: Infoprint Solutions Company, LLC, Boulder, CO (US)

(*) Notice: Subject to any disclaimer, the term of this patent is extended or adjusted under 35 U.S.C. 154(b) by 339 days.

(21) Appl. No.: 11/966,204

(22) Filed: Dec. 28, 2007

(65) Prior Publication Data

US 2009/0168083 A1 Jul. 2, 2009

(51) Int. Cl.
  *H04N 1/54* (2006.01)
  *H04N 1/56* (2006.01)
  *H04N 1/60* (2006.01)
  *G06K 15/00* (2006.01)
  *G06K 15/02* (2006.01)
  *G09G 5/06* (2006.01)

(52) U.S. Cl. .................. 358/1.9; 358/3.23; 358/523; 358/524; 358/525; 358/518; 382/162; 382/163; 382/164; 382/165; 382/166; 382/167; 345/601; 345/602; 345/603; 345/604; 345/606

(58) Field of Classification Search .............. 358/1.9, 358/3.23, 523, 524, 525, 518; 382/162–167; 345/601–604, 606
See application file for complete search history.

(56) References Cited

U.S. PATENT DOCUMENTS 5,208,911 A * 5/1993 Newman et al. ............ 345/600
5,644,509 A * 7/1997 Schwartz .................... 358/518
6,023,351 A * 2/2000 Newman ..................... 358/524

(Continued)

FOREIGN PATENT DOCUMENTS

EP 0706287 A2 * 4/1996

(Continued)

OTHER PUBLICATIONS

Poynton, Charles, et al.; *Color Science and Color Appearance Models for CG, HDTV, and D-Cinema*; SIGGRAPH 2004.

(Continued)

*Primary Examiner*—King Y Poon
*Assistant Examiner*—Beniyam Menberu
(74) *Attorney, Agent, or Firm*—Duft Bornsen & Fishman LLP

(57) ABSTRACT

Methods and apparatus for determining a preferred size for a Link LUT as used in conversion from an input color space defined by an input ICC profile into an output color space defined by an output ICC profile. The Link LUT may be incorporated within a device link structure as generally defined in the ICC specification or within a Link Color Conversion CMR in an AFP architecture system. The preferred size is determined from the size of an input LUT associated with the input ICC profile and the size of an output LUT associated with the output ICC profile. In AFP architecture systems, the input and output LUTs and profiles may each be incorporated in appropriate Color Conversion CMRs. The preferred size is determined as a reduced size that requires less computation to generate but does not cause loss of accuracy in conversion between the input and output color spaces.

15 Claims, 7 Drawing Sheets

U.S. PATENT DOCUMENTS

| | | |
|---|---|---|
| 6,275,607 B1 * | 8/2001 | Shimizu et al. ............. 382/167 |
| 6,278,805 B1 * | 8/2001 | Gregory et al. ............. 382/276 |
| 6,404,511 B1 * | 6/2002 | Lin et al. ..................... 358/1.9 |
| 6,681,041 B1 | 1/2004 | Stokes et al. |
| 6,809,740 B1 * | 10/2004 | Weed .......................... 345/589 |
| 6,825,958 B1 * | 11/2004 | Fukasawa et al. ........... 358/523 |
| 7,068,284 B2 | 6/2006 | Stokes |
| 2003/0133138 A1 * | 7/2003 | Namikata ................... 358/1.9 |
| 2004/0021882 A1 * | 2/2004 | Kakutani .................... 358/1.9 |
| 2005/0219585 A1 | 10/2005 | Suzuki et al. |
| 2005/0248787 A1 | 11/2005 | Aschenbrenner et al. |
| 2005/0273523 A1 | 12/2005 | Aschenbrenner et al. |
| 2005/0273524 A1 | 12/2005 | Aschenbrenner et al. |
| 2005/0281459 A1 * | 12/2005 | Bala et al. ................... 382/162 |
| 2006/0001892 A1 * | 1/2006 | Bai ............................. 358/1.9 |
| 2006/0050288 A1 | 3/2006 | Aschenbrenner et al. |
| 2006/0159334 A1 | 7/2006 | Haikin et al. |
| 2007/0127074 A1 * | 6/2007 | Hayaishi .................... 358/3.01 |
| 2008/0151276 A1 * | 6/2008 | Mori .......................... 358/1.9 |

FOREIGN PATENT DOCUMENTS

| | | |
|---|---|---|
| JP | 2004172809 | 6/2004 |
| JP | 2006197395 | 7/2006 |

OTHER PUBLICATIONS

Ecker, Herbert F.; *Soft Proofing of Multi-Color Documents in a Panoramic Environment Using Real Time Spectral Processing (Inspec Abstract)*; IS&T; Thirteenth Color Imaging Conference. Color Science and Engineering Systems, Technologies, and Applications. Final Program and Proceedings; p. 320; 2005.

Zeng, Huanzhao; *A Fast Linking Approach for CMYK to CMYK Conversion Preserving Black Separation in ICC Color Managements System (Inspec Abstract)*; SPIE; Proceedings of the SPIE—The International Society for Optical Engineering; vol. 5293, No. 1, pp. 262-268; 2003.

* cited by examiner

METHODS AND APPARATUS FOR DETERMINING A LOOKUP TABLE SIZE FOR AN AFP LINK CMR

RELATED PATENTS

This patent application relates to commonly owned, co-pending patent applications:

U.S. patent application Ser. No. 11/077,689, filed 11 Mar. 2005;

U.S. application Ser. No. 11/077,687, filed 11 Mar. 2005;

U.S. patent application Ser. No. 11/077,688, filed 11 Mar. 2005; and

U.S. patent application Ser. No. 11/145,820, filed 6 Jun. 2005, all of which are hereby incorporated by reference.

BACKGROUND

1. Field of the Invention

The invention relates generally to color presentation systems that present color data objects produced in accordance with an input ICC profile on a presentation device associated with an output ICC profile. More specifically, the invention is useful in an AFP architecture where a presentation device provides a Link Color Management Resource (CMR) to determine the preferred size for the lookup table incorporated in the Link CMR.

2. Discussion of Related Art

In color presentation devices (e.g., color printers and displays) a color object is typically created by a device or application and transferred to the presentation device for output to a user. The device or application that generated the color data object has a color profile associated therewith. The color profile defines parameters and aspects of the color capabilities of the device or application. This profile may be referred to herein as an input profile. The presentation device typically has different color capabilities and thus has different parameters and aspects defining its capabilities. The parameters of the presentation device are defined in a color profile associated with the presentation device and is referred to herein as an output profile.

As is generally known in the art, the parameters that define the color capabilities of a device or application may be specified in a number of different manners. Color capabilities may be defined, for example, in an "RGB space" (defined in terms of red, green, and blue colors) or may be defined, for example, in a "CMYK space" (defined in terms of cyan, magenta, yellow, and block colors). Numerous other color spaces may be used to define capabilities of a device or application.

Further, the format for defining such input or output profiles has been defined by an industry consortium, namely, the International Color Consortium (the ICC see, e.g., www.color.org). The ICC provides an ICC profile as a standardized format for defining the color profile information for a device or application. Device profiles provide color management systems with the information necessary to convert color data between native device color spaces and device independent color spaces. For each device class (input devices, output devices and others), a series of base algorithmic models are described which perform the transformation between color spaces. These models provide a range of color quality and performance results which provide different trade-offs in memory footprint, performance and image quality.

The ICC device profiles are standardized and obtain their openness by using a well-defined reference color space and by being capable of being interpreted by any ICC operating system or application that is compliant with the specification. In combination with profiles for other devices color transformations may be determined that enable colors captured on one device (e.g., an input device such as a scanner, a camera, etc.) to be reproduced satisfactorily on many other devices (e.g., output devices such as printers, etc.). The information required in the profile is adequate to ensure the level of color fidelity selected by the user and for the design of a default color management module (CMM) to transform color information between native device color spaces. Such CMMs are found in many operating systems and applications.

In processing a color object in a presentation device (e.g., an output device such as a printing system), the device controller performs calculations to convert the color space defined in the input profile associated with the input device/application that generated the color object into the color space of the presentation device. This conversion is performed according to ICC specification through a profile connection space (PSC). This connection space interface which provides an unambiguous connection between the input and output profiles. It allows the profile transforms for input and output devices to be decoupled so that they can be produced independently. The well-defined PCS of ICC provides the common interface for the individual device profiles. It is the virtual destination for input transforms and the virtual source for output transforms. If the input and output transforms are based on the same PCS definition, even though they are created independently, they can be paired arbitrarily at run time by the color-management engine (CMM) and will yield consistent and predictable results when applied to color values. In general, a pixel value is converted from the input device color space using information in the input profile into a form defined by the PSC. This intermediate value may then be converted from the PSC form into the color space of the output device by use of information in the output profile. Thus a pixel value is converted fro the input device color space to the output device color space through the intermediate form of the PSC.

In an Advanced Function Presentation (AFP) environment as defined by InfoPrint Solutions Company and IBM a Color Management Resource Engine (CMRE) creates Color Management Resource (CMR) objects to perform color management. These CMRs include Color Conversion CMRs, Link Color Conversion CMRs, Index CMRs, etc. A Color Conversion CMR may incorporate an ICC input profile (also sometimes referred to as an audit profile) or may incorporate an ICC output profile (also sometimes referred to as an instruction profile). An ICC profile may specify color information in a variety of ways including, for example, equations that are applied to a pixel value to generated a new pixel value in a different color space. A profile may also include a color lookup table (CLUT) that translates an input value to a corresponding output value. The CLUT is used to provide for interpolation of a pixel value by interpolating between table entry values to obtain a new pixel value in a different color space. In an AFP presentation device a CMR object may include a lookup table (LUT) generated based on an ICC profile.

In AFP devices, a Link CMR is generated by combining the ICC input profile of the device or application that generated an AFP graphical data object and the ICC output profile of the presentation device on which the AFP data object is to be presented (i.e., rendered). The Link CMR typically includes a Link LUT that mathematically combines an input LUT associated with the input profile and an output LUT associated with the presentation device. Thus the Link CMR may be re-used for Color Conversion of multiple data objects generated from the same source device or application.

The size of the Link LUT is generally a function of the sizes of the input and output LUTs. The size of such an interpolation table in part determines the accuracy of the mathematical conversions that may be generated by interpolating between entries of the table. If the table is larger, specifying more input data points corresponding to specified output values, the interpolation between table entry values risks less loss of accuracy—in other words the dense, large interpolation table is capable of generating improved conversion that more accurately represents the underlying function. However, generating such a larger table may be time consuming. Further, depending on the level off accuracy that the input device and output (presentation) device may be capable of processing, too large of an interpolation table may simply be wasted. Thus there is a tradeoff to balance the size of the interpolation table to achieve desired accuracy with time required for creating excessive, un-necessary entries (i.e., as small as possible without loss of desired accuracy in the color reproduction).

It is evident from the above discussion that an ongoing need exists for improved methods and apparatus for determining a preferred size of a Link LUT to reduce loss of accuracy in color reproduction when using a Link LUT such as in an AFP Link CMR.

SUMMARY

The present invention solves the above and other problems, thereby advancing the state of the useful arts, by providing methods and apparatus for determining the preferred size of a Link LUT such as used in an AFP Link CMR such that the Link LUT is small while reducing loss of accuracy in the use of the Link LUT for color conversion.

A first aspect hereof provides a method comprising obtaining an input ICC profile defining an input color space associated with presentation data in a data stream received for output at a presentation device. The method further comprises obtaining an output ICC profile defining an output color space of the presentation device. The method then generates an input LUT from the input ICC profile the input LUT having a size (Pin) and generates an output LUT from the output ICC profile the output LUT having a size (Pout). The method then determines the preferred size of the Link LUT based on Pin and Pout. A Link LUT is then generated having the preferred size for converting input data specified using the input color space to output data using the output color space. The preferred size of the Link LUT is determined so as to reduce loss of accuracy in the Color Conversion and to reduce computational time in generating the Link LUT.

Another aspect hereof provides method for managing a Link LUT in a Link CMR in an AFP printing system where the Link LUT has a preferred size to reduce the size of the Link LUT with reduced loss of accuracy. The method includes determining a size (Pin) of an input LUT associated with the Link CMR wherein the input LUT defines an input color space and determining a size (Pout) of an output LUT associated with the Link CMR wherein the output LUT defines an output color space. The method then determines the preferred size the Link LUT as:

$t^j$ $t=(Pout)^{1/j}$ (rounded up to the nearest integer t such that $t^j \geq Pout$)

where "j" is the number of components in the input LUT.

The method then generates a Link LUT of the preferred size from information in the input LUT and the output LUT and uses the Link LUT to convert color data objects from the input color space to the output color space.

DETAILED DESCRIPTION OF THE DRAWINGS

FIGS. 1 through 7 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
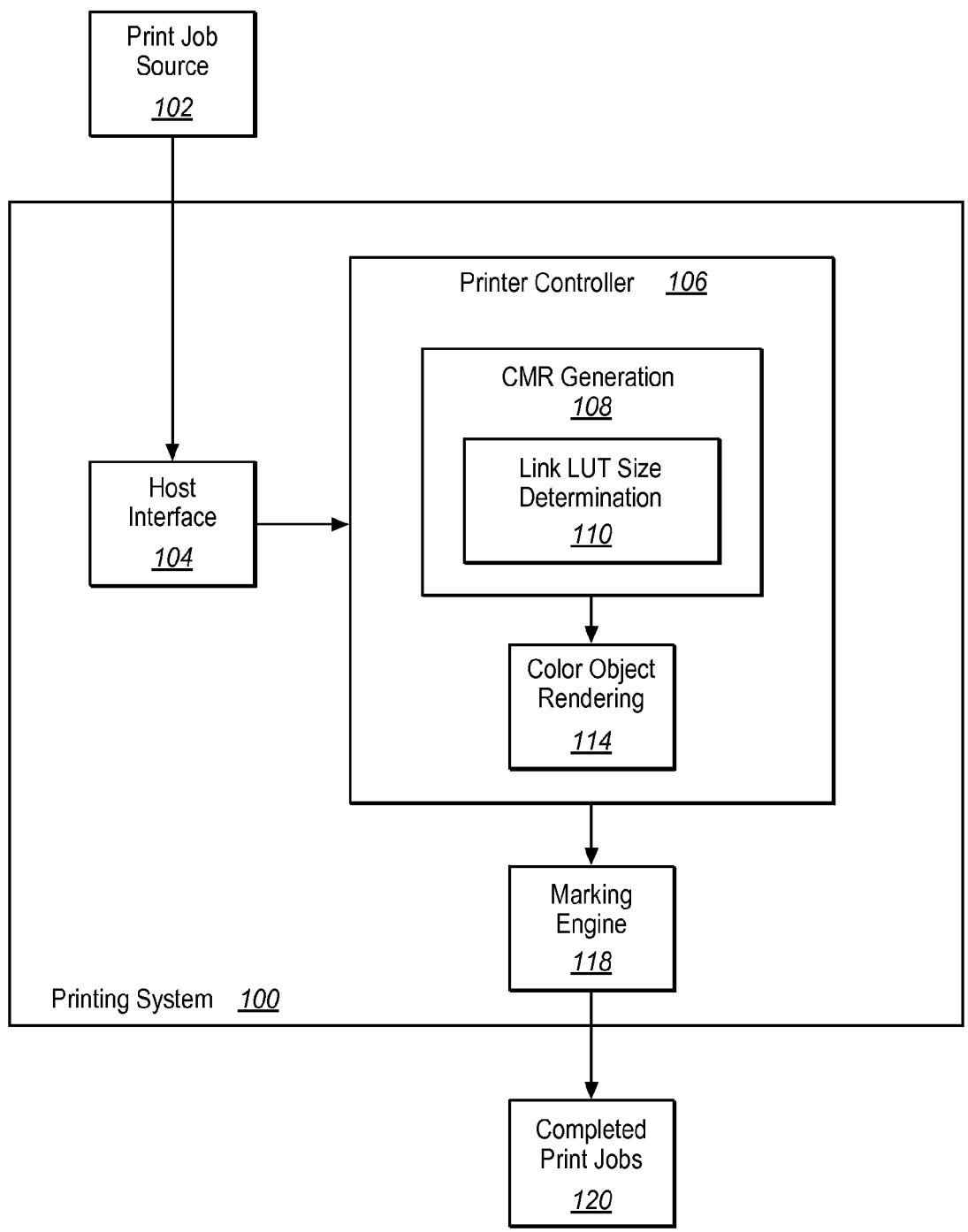
FIG. 1 is a block of an exemplary system embodying features and aspects hereof to determine a preferred size of a Link LUT for direct conversion fro man input color space to an output color space.

FIG. 1 is a block diagram of a printing system 100 enhanced in accordance with features and aspects hereof to determine a preferred size for a Link LUT as used in an AFP Link Color Conversion CMR for processing color data objects. Printing system 100 includes printing controller 106 adapted to receive and process print jobs from a print job source 102 received through host interface 104. Printer controller 106 includes object rendering element 114 to render/rasterize data objects received in such print jobs and transfers the rendered images to marking engine 118 for imprinting on suitable printable media as completed jobs 120. Printing system 100 may be any suitable printing system adapted for imprinting utilizing any marking technique such as liquid ink deposition, dry toner, etc. Further, marking engine 118 may imprint on cut sheets of printable media or make imprint on continuous forms of printable media. In particular, printing system 100 and printer controller 106 are adapted to process full color images provided as color data objects in received print jobs.

Printer controller 106 may include CMR generation element 108 adapted to generate an AFP Link Color Conversion CMR useful in processing AFP color data objects. As is generally known in the art, an AFP Link CMR is generated using complex calculations involving an input ICC profile and an output ICC profile associated with the received data object. The input profile to be used may often be specified as a part of the received data object (e.g., a Color Conversion CMR associated with the received AFP color data object and incorporating input ICC profile information within the CMR). The output profile to be used in processing of the color data object may be specified in a variety of manners. As above, the output profile may be associated with the received color data object. Or, for example, the output profile may be specified as a global or default parameter of the presentation device such that the same output profile is used for processing of all received color objects. Still further, an output profile may be generated and downloaded to the presentation device from an attached system and then applied for use within a particular portion of an associated job (e.g., for a particular page, group of pages, portions of page, or an entire document). Details of command syntax and semantics for associating a received data object with ICC profiles and rendering intent are specific to any particular command specifications.

Though FIG. 1 is presented in terms of an AFP printing system, those of ordinary skill in the art will recognize other document processing architectures in which features and aspects hereof may be beneficially applied. Since the underlying ICC profiles define the input and output color spaces and the ICC specifications provide a suggestion of a "device link" structure, features and aspects hereof may be incorporated in essentially any architecture that implements the ICC specifications. Thus the Link LUT or Link Color Conversion CMR may also be implemented as a device link structure in the ICC architecture.

In general, ICC profiles may specify various parameters associated with the color space of a generated data object and/or the color space of a presentation device such as printing system 100. Detailed specifications of parameters, fields, and values in such input and output ICC profiles as well as various types of rendering intent indicia are well defined in industry standard specifications publicly available from the ICC and are well known to those of ordinary skill in the art. These parameters may be specified in a number of well defined formats including, for example, LUTs. In the AFP architecture, CMRs are used, for example, to define Color Conversion and translation processing parameters between an input ICC profile of the data object and an output ICC profile of the presentation device. The color data object is converted or translated into the ICC PSC color space based on the input ICC profile and thence from the PSC color space into corresponding colors based on the output ICC profile of the printing system 100.

In generating a Link CMR, a Link LUT is generated. As noted above, the Link LUT may be generated as a large table with a large number of grid points defined in each component. Such a large table provides a higher degree of accuracy. However, a smaller table may suffice for accuracy in conversion of color spaces while consuming less time to generate. Thus there is a preferred size of the Link LUT determined by Link LUT size determination element 110 within CMR generation element 108. The preferred size is determined so as to reduce the size of the Link LUT without reducing accuracy of the Color Conversions performed therethrough. Link LUT size determination element 110 therefore analyzes properties of the input LUT and the output LUT that go into generation of the Link LUT entries and determines the preferred size from these properties. In particular, as discussed further herein below, the total size of the Input LUT and the output LUT as well as the size for each component of the input/output LUT is considered in determining the preferred size of the Link LUT.

Those of ordinary skill in the art will readily recognize a variety of additional modules or elements operable within a typical printer controller 106 and a typical printing system 100. Such additional elements are eliminated herein for simplicity and brevity of this discussion and are well known to those of ordinary skill in the art. Still further, the particular modular decomposition of elements shown within printing system 100 and printer controller 106 are intended merely as suggestive or exemplary of one possible modular decomposition. The elements of printing system 100 may be integrated in a different manner or separated in a different manner than that shown in FIG. 1. Further, though shown as integrated within the operation of a printer controller 106 of a printing system, such profile or CMR processing may also be performed in a print server or other computing nodes associated with a printing system 100. Thus the features and aspects hereof for determining the preferred size of a Link LUT may be equally applicable to other computational systems where ICC profile or AFP CMR processing may be performed. FIG. 1 is thus intended merely as exemplary of one possible arrangement of elements and modules within a printing system 100 in accordance with features and aspects hereof.

Figure 2:
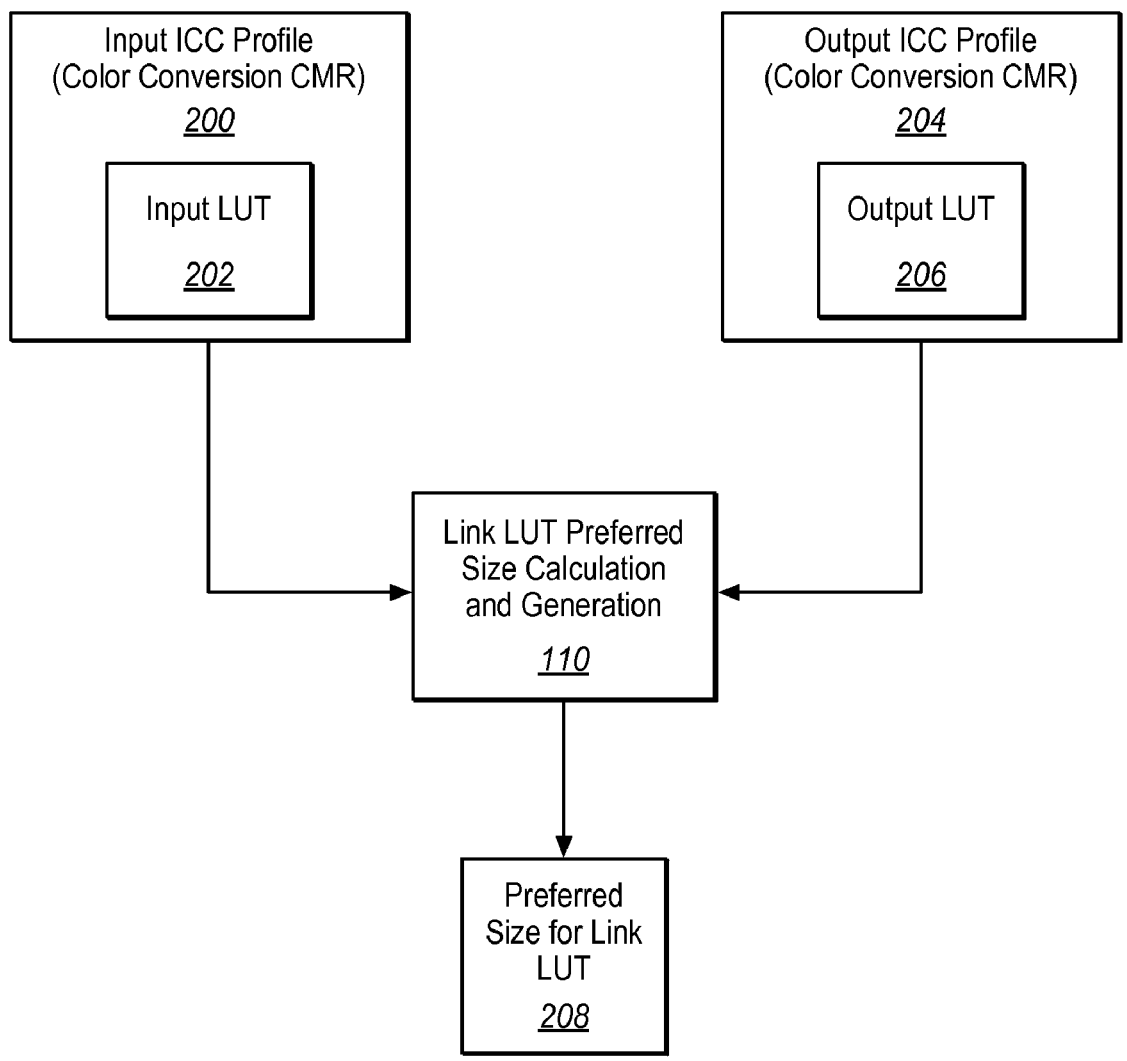
FIG. 2 is a block diagram describing exemplary flow of data in an element that determines a preferred size for a link LUT in accordance with features and aspects hereof.

FIG. 2 is a diagram further suggesting operation of Link LUT preferred size determination element 110 of FIG. 1. Link LUT size determination element 110 analyses information from the input ICC profile 200 (e.g., a Color Conversion CMR) including an input LUT 202 (or other form of representation of the input color space). Link LUT preferred size determination element 110 also analyzes information in the output ICC profile 204 (e.g., a Color Conversion CMR) including an output LUT 206 (or other suitable representation of the output color space). Based on this analysis, element 110 generates a preferred size for the Link LUT 208. This preferred size 208 may then be utilized by processing features within the printer controller or printer server to generate the Link LUT entries and then to utilize the generated Link LUT in converting data objects from the input color space defined by input ICC profile 200 into the output color space defined by output ICC profile 204.

Figure 3:
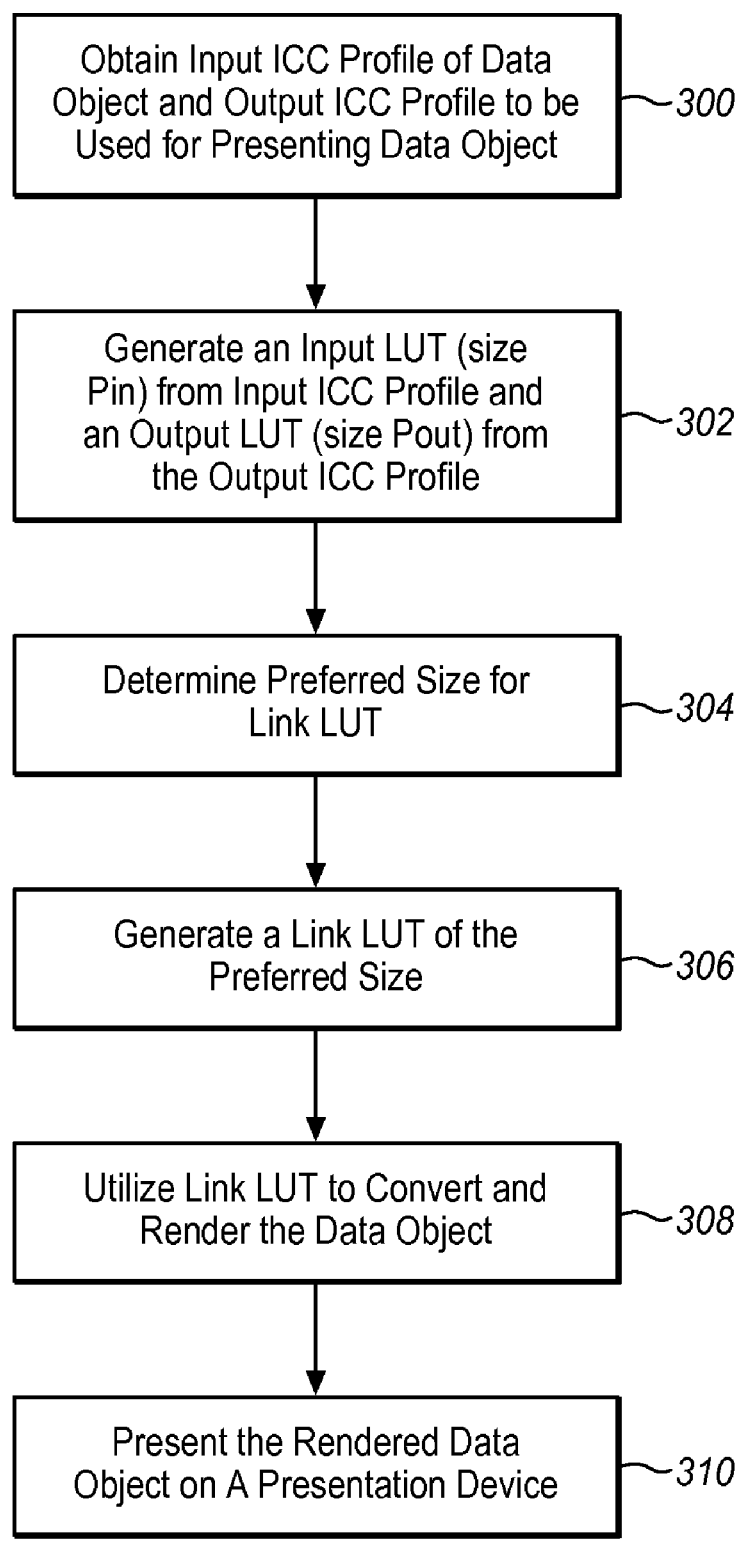
FIGS. 3 through 6 are flowcharts describing exemplary methods in accordance with features and aspects hereof to determine a preferred Link LUT size.

FIG. 3 is a flowchart describing a method in accordance with features and aspects hereof for determining the preferred size of a Link LUT table such as may be utilized in an AFP Link Color Conversion CMR. Step 300 obtains an input ICC profile associated with the data object in the datastream. Step 300 also obtains an output ICC profile associated with the presentation device and selected for utilization in presenting a particular data object from the datastream. Step 302 then generates an input LUT having a size Pin and an output LUT having a size Pout. The input LUT is generated from information in the input ICC profile. The output LUT is generated from information in the output ICC profile. Where the input ICC profile specifies the input color space in the format of a CLUT, the input LUT is essentially the same as the CLUT. Where the input ICC profile specifies the input color space in other terms such as a B-curve format, the input color space so represented may then be transformed into an input LUT having the size Pin. In like manner, the output ICC profile may specify the output color space in CLUT format or in other formats such as a B-curve format. As above with the input color space, the output LUT is generated from the output color space representation in the output ICC profile and the output LUT has a size of Pout. Those of ordinary skill in the art will readily recognize well known mathematical transformations to translate any of the various allowed representations of a color space in an ICC profile into a corresponding LUT.

Step 304 next determines the preferred size for the Link LUT construct to be created. As noted above, a Link LUT construct is incorporated within an AFP Link Color Conversion CMR. In like manner, a Link LUT may be incorporated into any document format processing architecture that utilizes the ICC profile specifications. Such a Link LUT may be incorporated in a so called "device link" structure as specified in the ICC specifications. As discussed further herein below, step 304 analyzes the total size of both the input and output LUTs generated by step 302 and may analyze other attributes of both LUTs to determine the preferred size. Further as noted above, the preferred size is generally that size which reduces the Link LUT size without risking loss of accuracy in the conversion between the input color space and the output color space.

Step 306 then generates a Link LUT of the determined preferred size with entries adapted to transform pixel values from the input color space to the output color space. Step 308 utilizes the generated Link LUT to convert pixel data into the output color space and to render the data object as required for later presentation by operation of step 310. As noted above, features and aspects hereof may be suitably implemented within a print server computing node as well as the rasterizing printer controller. When implemented within a print server computing node, steps 308 and 310 may be omitted and the generated Link LUT of step 306 is merely stored in an appropriate structure (e.g., an AFP Link Color Conversion CMR) associated with the print job for subsequent utilization in a rasterizing print controller.

Figure 4:
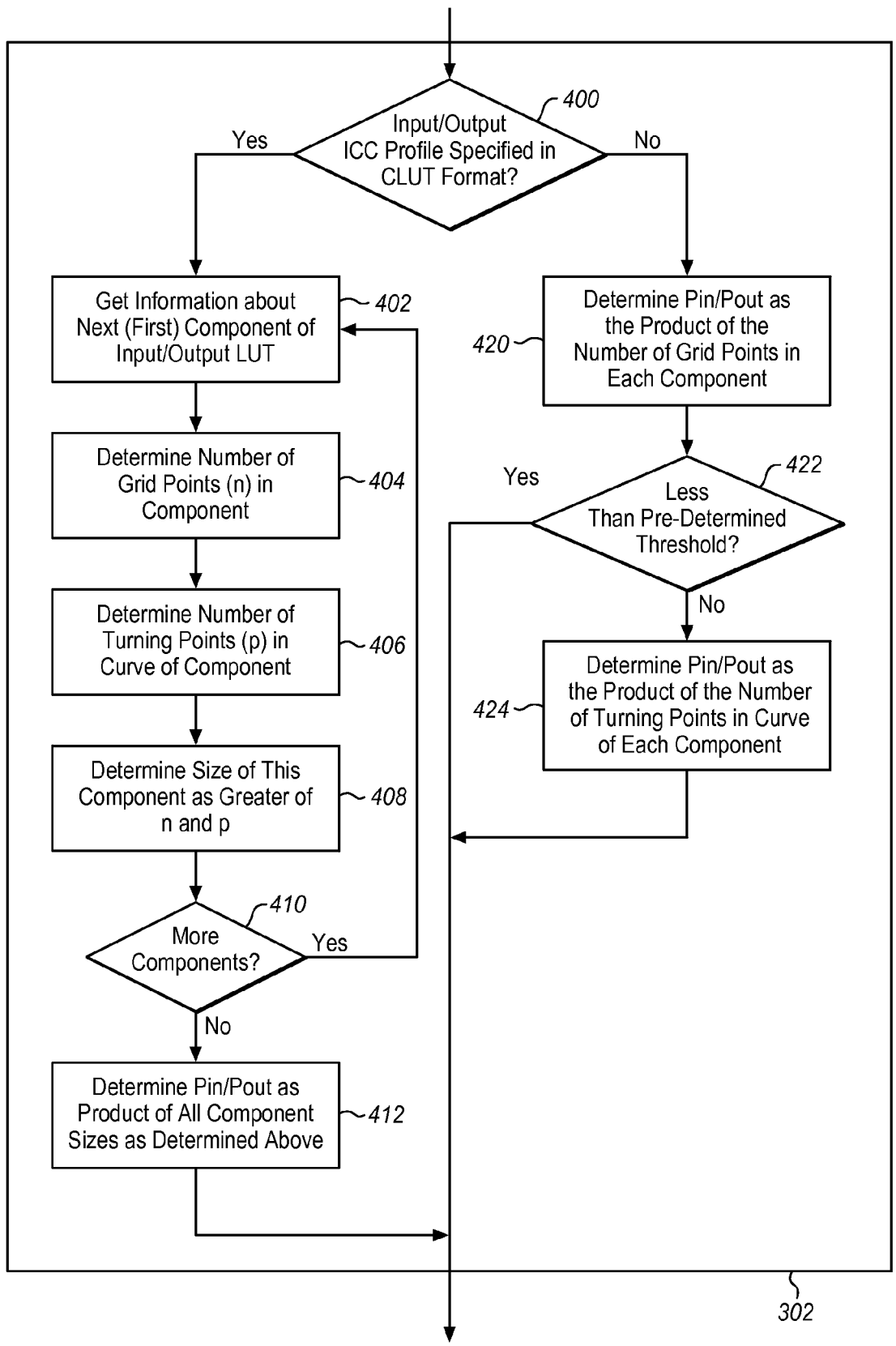

FIG. 4 is a flowchart providing exemplary additional details of processing of step 302 that determines the size (Pin) of an input LUT and the size (Pout) of an output LUT to be incorporated into a generated Link LUT. The method of FIG. 4 is identical for determining the size of an input LUT or an output LUT. Step 400 first determines whether the ICC profile input/output profile from which the LUT to be analyzed was generated indicates that the color space is already specified in a CLUT format. If so, processing continues at step 402 and, if not, processing continues at step 420 discussed further herein below.

Where the input/output ICC profile indicates that its corresponding color space is defined in a CLUT format, steps 402 through 410 are iteratively operable to determine size information about each component of the input/output color space. Step 402 gets information about the first (or next) component of the input/output LUT to be analyzed. Step 404 next determines the number of grid points (n) in the CLUT as already specified in the input/output ICC profile. Step 406 next determines the number of slope change points (p) in the curve represented by the current component. As used herein, a "slope change point" is similar to the well known mathematical concept of a "turning point". As is well known in the art, a "turning point" is defined as: a point on the graph at which the slope of the tangent changes its sign. Thus a turning point is either a local maximum point or a local minimum point. A slope change point is a point on a curve defined by a series of points $p_0 \ldots p_n$ (i.e., grid points of the color component) where the slope between point $p_{i-1}$ and $p_n$ differs by more than a threshold value from the slope between points $p_i$ and $p_{i-1}$. The threshold value may be determined empirically for any particular printing system as a function of the desired level of accuracy determined by slope change points as compared to the number of grid points. In one exemplary embodiment, the slope change threshold value is about 0.5 corresponding to about a 30 degree angle formed by the two sloping segments. Thus the number of "slope change points" in a component of the LUT is another measure of the linearity of the color component as a whole.

Step 408 determines the size of this component of the input/output LUT being analyzed as the greater value of n and p. Step 410 then determines whether more components remain to be analyzed. If so processing continues looping back to step 402 to get information about a next component of the input/output LUT being analyzed. If all components have been analyzed, step 412 next determines the size of the input/output LUT being analyzed (Pin/Pout) as the product of all components sizes determined above by operation of steps 402 through 410. For example, if the size of a three component input/output LUT is 33, 33, and 33 and the number of slope change points for each component corresponding curve are 25, 19, and 40, respectively, then the size of the components of the LUT will be determined as 33, 33, and 40.

If step 400 determined that the input/output profile being analyzed does not use the CLUT format for defining its color space, steps 420 through 424 determine the size of the input/output LUT being analyzed. Step 420 determines the size of the input/output LUT (Pin/Pout) has the product of the number of grid points in each component of the input/output LUT being analyzed. If the LUT size so determined (Pin/Pout) is less than a pre-determined threshold as determined by step 422, the size determined by step 420 represents the size of the input/output LUT being analyzed (e.g., Pin/Pout as determined by step 420 is a sufficient representation of the corresponding LUT size). Otherwise, step 424 recalculates the input/output LUT size (Pin/Pout) as the product of the number of slope change points in the curve represented by each component.

The pre-determined threshold values may be determined through any suitable, empirical techniques. In one exemplary embodiment, the threshold values used in selecting the proper representation of the LUT size (e.g., product of the number of grid point or product of the number of slope change points) may be determined based on the number of components in the color space and a typical number of grid points found in data objects encoded in such a color space. For example, where the number of components is 1, no threshold need be specified (e.g., the threshold may be thought of as infinite). Where the number of color components in a color space is 2 empirical results have noted that a 129×129 (or 16641) threshold as the number of grid points in each of the two color components provides a sufficient representation. Where the number of color components is t3, empirical results suggest that the threshold value of 35937 is appropriate (e.g., 33×33×33—a typical number of grid points in each of the three color components). Where the number of color component is 4, empirical results have determined an appropriate threshold value to be 6561 (e.g., 9×9×9×9—or the typical number of grid points in each of 4 color components). Empirical results suggest that where the number of color components is 5 or higher, 3 grid points may be presumed to be sufficient and typical or representing such a color space. Thus $3^k$ where "k" is the number of color components in the color space may be used as a threshold value for a color space specifying 5 or more color components.

Figure 5:
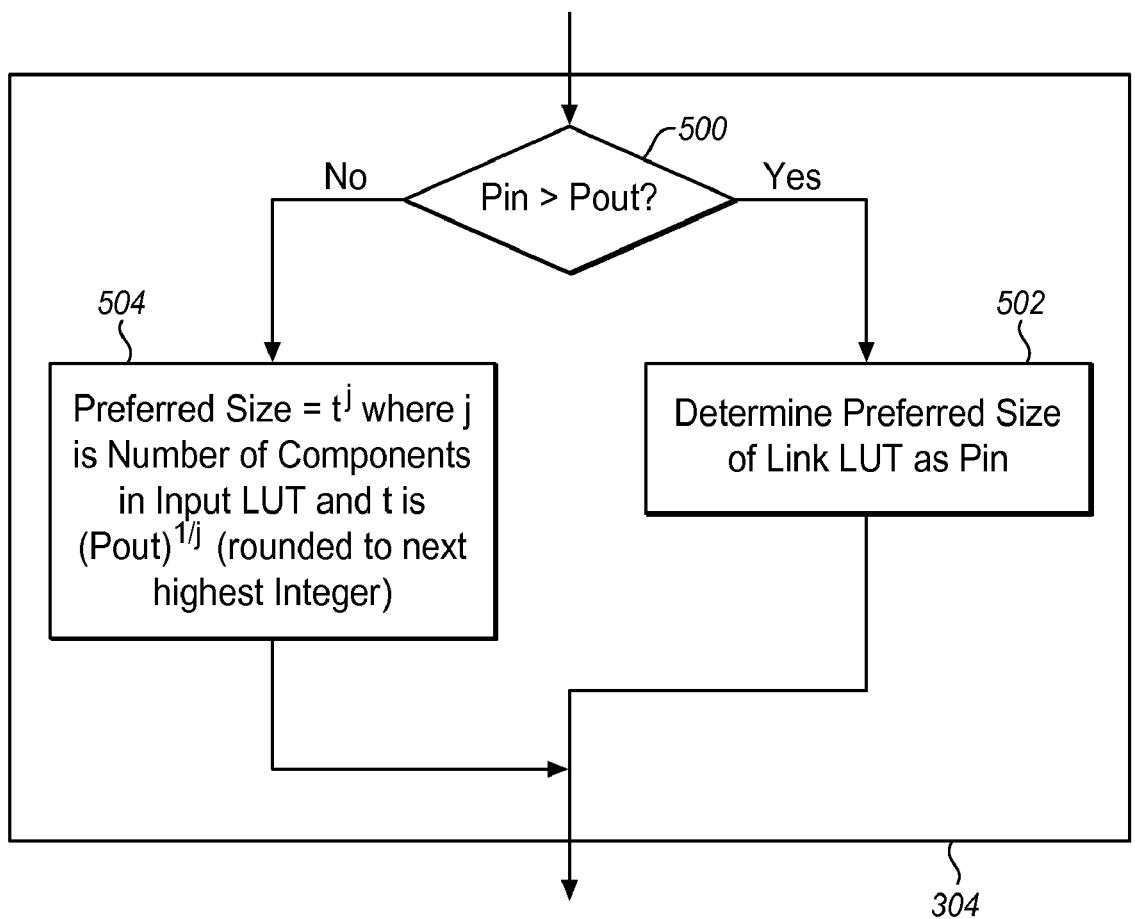

Having thus determined the size of the input LUT (Pin) and the output LUT (Pout), step 304 determines the preferred size of the Link LUT based in part on the Pin and Pout values. FIG. 5 is a flowchart providing exemplary additional details of the processing of step 304 to determine a preferred size for the Link LUT. Step 500 determines whether the Pin value determined by step 302 is greater than the Pout value determined by step 302 of FIGS. 3 and 4. If so, step 502 determines the preferred size of the Link LUT as the value of Pin. In other words, if the input LUT provides higher accuracy than the output LUT, the Link LUT may provide at least the same accuracy.

If step 500 determines that Pin is less than or equal to Pout, step 504 determines the preferred size as $t^j$ where "j" is the number of components in the input LUT and "t" is $(Pout)^{1/j}$ (rounded to the next highest integer). The number of components in the Link LUT is preferably the same as the number of components in the input LUT (i.e., the Link LUT will have "j" components). For example, if the input ICC profile specifies CMYK to CIELAB conversion with an input LUT size of 5×5×5×5=625, and the output ICC profile specifies XYZ to RGB conversion with the size of 17×17×17=4913, the size of the Link LUT is 9×9×9×9=6561. Specifically, $t=(4913)^{1/4}=8.37$, rounded to next integer t=9. Thus the Link LUT preferred size is $9^4=6561$ (9×9×9×9).

Figure 6:
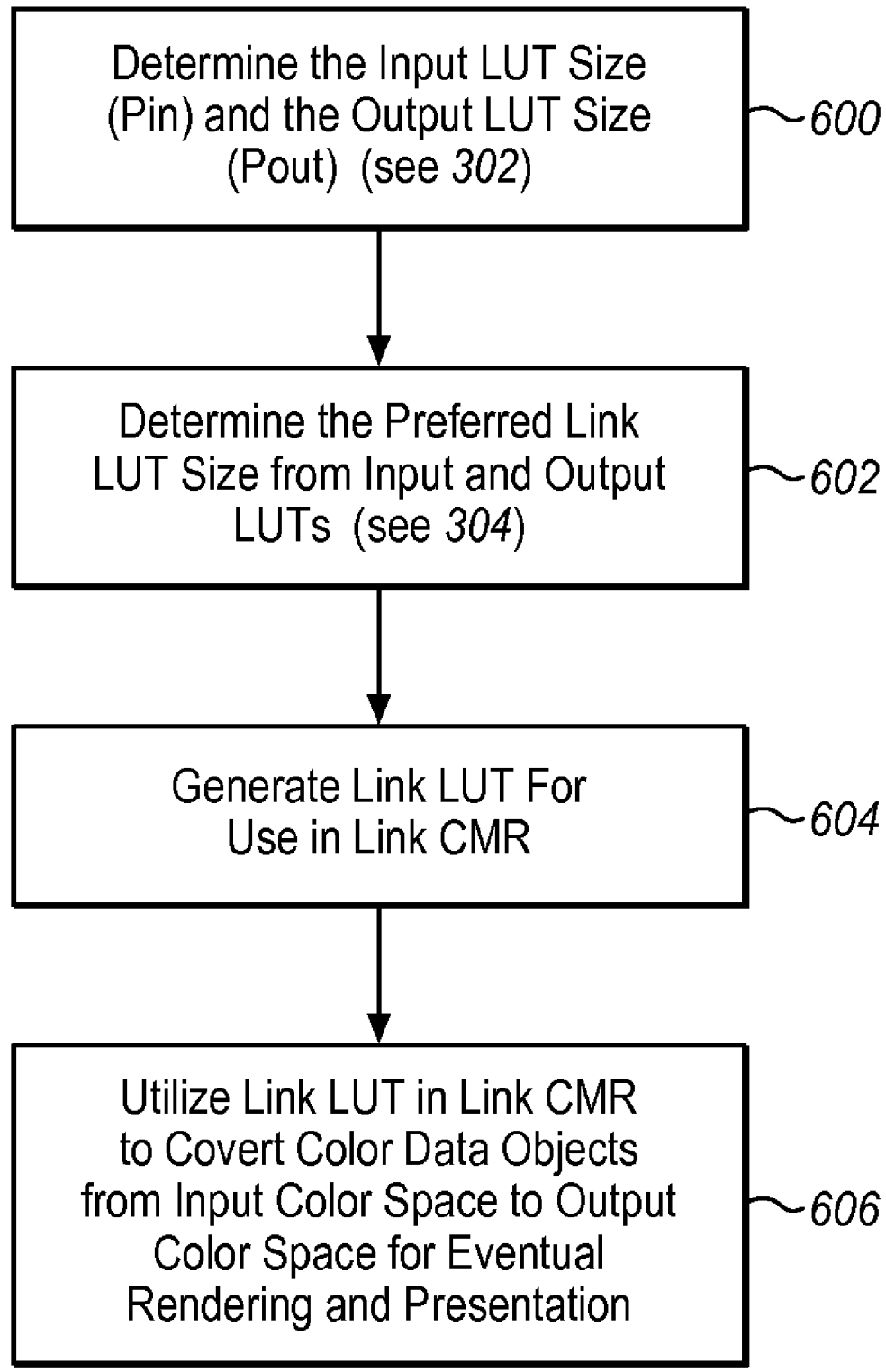

FIG. 6 is a flowchart describing another exemplary method in accordance with features and aspects hereof to determine a preferred Link LUT size based on the size of an input LUT (Pin) and the size of an output LUT (Pout). As noted above, an input LUT may be incorporated within a Color Conversion CMR associated with an input data object. In like manner, and output LUT may be associated with a Color Conversion CMR representing the color space of the presentation device. In both cases, the ICC profile information within the CMR may specify the color space in any of several formats including, for example, CLUT and B-curve structures. Step 600 is thus essentially the same processing as step 302 discussed above with respect to FIGS. 3 and 4. Having so determined the input LUT size and output LUT size, step 602 determines the preferred size of the Link LUT to be incorporated in a Link Color Conversion CMR. The preferred size is determined, in part, as a function of Pin and Pout values determined by step 600. Thus, step 602 is essentially identical to processing described above as step 304 in FIGS. 3 and 5. Having thus determined a preferred size, step 604 generates the Link LUT for use or incorporation within the Link Color Conversion CMR. Step 606 then utilizes the Link LUT incorporated within the Link Color Conversion CMR to convert color data objects in the datastream from the input color space of the device or application that generated the data object into the output color space of a particular presentation device. Eventually, the converted data objects will be rendered and presented on the specific presentation device.

Figure 7:
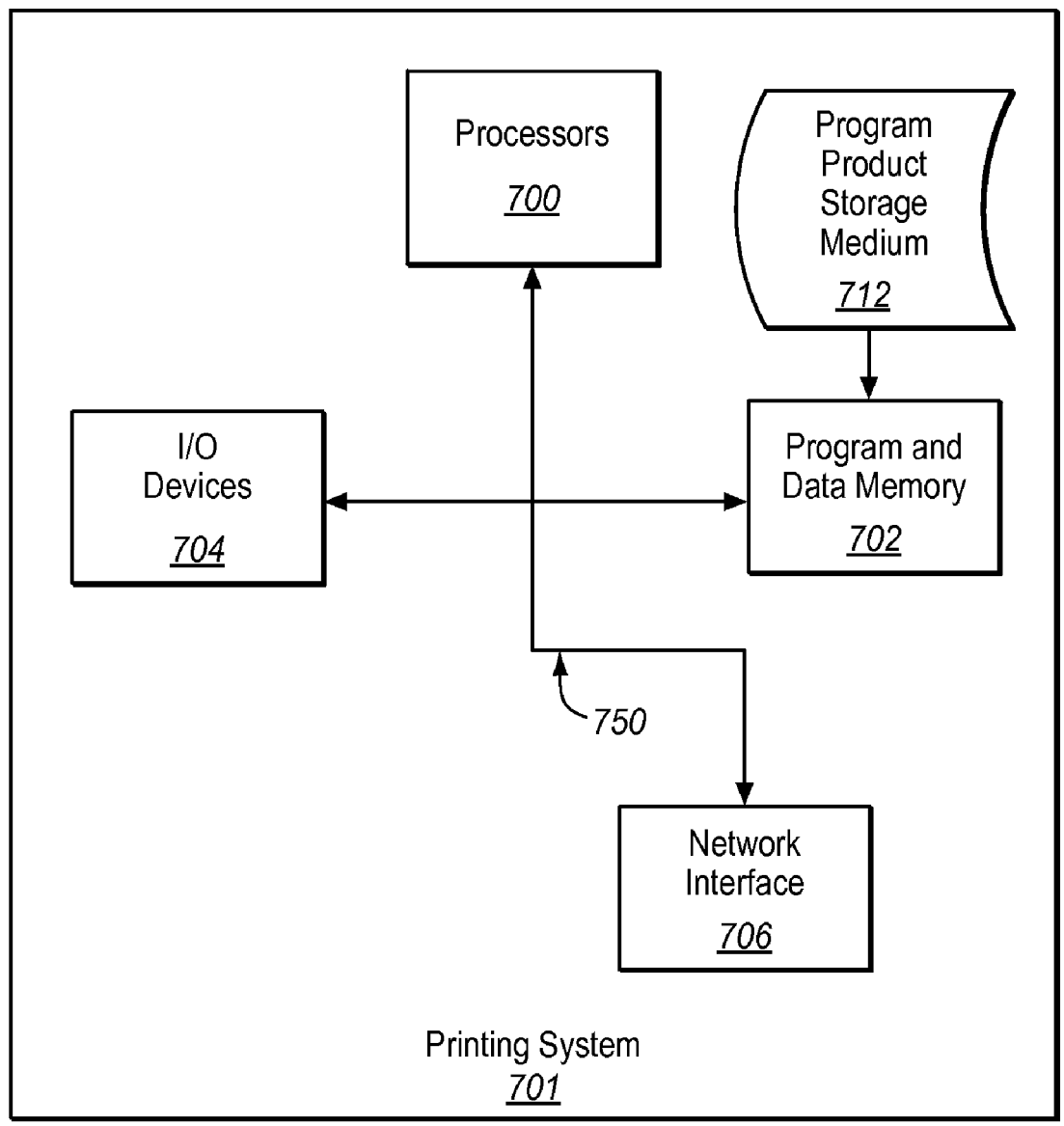
FIG. 7 is a block diagram of an exemplary system that may include a computer readable medium embodying methods in accordance with features and aspects hereof to determine a preferred Link LUT size.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 7 is a block diagram depicting a printing system 701 as a system adapted to provide features and aspects hereof by executing programmed instructions and accessing data stored on a computer readable storage medium 712.

Furthermore, the invention can take the form of a computer program product accessible from a computer-usable or computer-readable medium 712 providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W) and DVD.

A data processing system suitable for storing and/or executing program code will include at least one processor 700 coupled directly or indirectly to memory elements 702 through a system bus 750. As noted above, processors may be distributed among various control elements of a printing system such as in a rasterizing printer controller and a page extractor post-processing element. The memory elements can include local memory employed during actual execution of the program code, bulk storage, and cache memories which provide temporary storage of at least some program code in order to reduce the number of times code must be retrieved from bulk storage during execution.

Input/output or I/O devices 704 (including but not limited to keyboards, displays, pointing devices, etc.) can be coupled to the system either directly or through intervening I/O controllers. Network adapter interfaces 706 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

What is claimed is:

1. A method operable in a print controller, the method comprising steps, performed in the print controller, of:
   obtaining an input ICC profile defining an input color space associated with presentation data in a data stream received for output at a presentation device;
   obtaining an output ICC profile defining an output color space of the presentation device;
   generating an input lookup table (LUT) from the input ICC profile, the input LUT having a size (Pin), wherein the input LUT comprises color value components to provide for interpolation of pixel values from the input color space to an intermediate color space;
   generating an output LUT from the output ICC profile, the output LUT having a size (Pout), wherein the output LUT comprises color value components to provide for interpolation of pixel values from the intermediate color space to the output color space;
   determining a preferred size of a Link LUT based on Pin and Pout; and
   generating the Link LUT having the preferred size for converting input data specified using the input color space to output data using the output color space,
   wherein the preferred size of the Link LUT is determined so as to reduce loss of accuracy in the Color Conversion and to reduce computational time in generating the Link LUT,
   wherein Pin is determined by performing the steps, in the print controller, of:
   determining Pin as the product of a number of grid points in each color value component of the input LUT;
   determining whether Pin is less than a predetermined threshold size;
   responsive to determining that Pin is not less than the predetermined threshold size, determining Pin as the product of a number of turning points in each color value component of the input LUT, wherein a turning point is a point on a curve defined of grid points of the color value component of the input LUT where a slope of a tangent changes sign.

2. The method of claim 1
   wherein Pin is determined by performing the steps, in the print controller, of:
   for each color value component of the input LUT,
   determining a first size value (n) as a number of grid points in said each color value component;
   determining the a second size value (p) as a number of turning points in said each color value component, wherein a turning point is a point on a curve defined of grid points of the color value component of the input LUT where a slope of a tangent changes sign; and determining a component size for said each component as the greater of n and p for said each color value component; and determining Pin as the product of the component size for each color value component of the input LUT.

3. The method of claim 1 wherein Pout is determined by performing the steps, in the print controller, of:

for each color value component of the output LUT,
determining a first size value (n) as a number of grid points in said each color value component;
determining the a second size value (p) as a number of turning points in said each color value component, wherein a turning point is a point on a curve defined of grid points of the color value component of the output LUT where a slope of a tangent changes sign; and
determining a component size for said each component as the greater of n and p for said each color value component; and determining Pout as the product of the component size for each color value component of the output LUT.

4. The method of claim 1 wherein Pout is determined by performing the steps, in the print controller, of:

determining Pout as the product of a number of grid points in each color value component of the output LUT;

determining whether Pout is less than a predetermined threshold size;

responsive to determining that Pout is not less than the predetermined threshold size, determining Pout as the product of a number of turning points in each color value component of the output LUT, wherein a turning point is a point on a curve defined of grid points of the color value component of the output LUT where a slope of a tangent changes sign.

5. The method of claim 1 wherein the step of determining the Link LUT size further comprises:

comparing Pin and Pout;

responsive to Pin being greater than or equal to Pout, using Pin as the Link LUT preferred size; and responsive to Pin being less than Pout, determining a preferred size $t^j$, wherein j is a number of components in the input LUT and t is $(Pout)^{1/j}$ rounded to the next highest integer.

6. A method for managing a Link lookup table (LUT) in a Link Color Management Resource (CMR) in an Advanced Function Presentation (AFP) printing system where the Link LUT has a preferred size to reduce the size of the Link LUT with reduced loss of accuracy, the method comprising steps, performed in the AFP printing system, of:

determining a size (Pin) of an input LUT associated with the Link CMR wherein the input LUT defines an input color space, wherein the input LUT comprises color value components to provide for interpolation of pixel values from the input color space to an intermediate color space;

determining a size (Pout) of an output LUT associated with the Link CMR wherein the output LUT defines an output color space, wherein the output LUT comprises color value components to provide for interpolation of pixel values from the intermediate color space to the output color space;

determining a preferred size $t^j$, wherein j is a number of components in the input LUT and t is $(Pout)^{1/j}$ rounded to the next highest integer;

generating a Link LUT of the preferred size from information in the input LUT and the output LUT; and using the Link LUT to convert color data objects from the input color space to the output color space.

7. The method of claim 6 wherein Pin is determined by performing the steps, in the AFP printing system, of:

for each color value component of the input LUT,
determining a first size value (n) as a number of grid points in said each color value component;
determining a second size value (p) as a number of turning points in said each color value component, wherein a turning point is a point on a curve defined of grid points of the color value component of the input LUT where a slope of a tangent changes sign; and
determining a component size for said each color value component as the greater of n and p for said each color value component; and determining Pin as a product of the component size for each color value component of the input LUT.

8. The method of claim 6 wherein Pout is determined by performing the steps, in the AFP printing system, of:

for each color value component of the output LUT,
determining a first size value (n) as a number of grid points in said each color value component;
determining the a second size value (p) as a number of turning points in said each color value component, wherein a turning point is a point on a curve defined of grid points of the color value component of the output LUT where a slope of a tangent changes sign; and
determining a component size for said each component as the greater of n and p for said each color value component; and determining Pout as a product of the component size for each color value component of the output LUT.

9. The method of claim 6 wherein Pin is determined by performing the steps, in the AFP printing system, of:

determining Pin as a product of a number of grid points in each color value component of the input LUT;

determining whether Pin is less than a predetermined threshold size;

responsive to determining that Pin is not less than the predetermined threshold size, determining Pin as a product of a number of turning points in each color value component of the input LUT, wherein a turning point is a point on a curve defined of grid points of the color value component of the input LUT where a slope of a tangent changes sign.

10. The method of claim 6 wherein Pout is determined by performing the steps, in the AFP printing system, of:

determining Pout as a product of a number of grid points in each color value component of the output LUT;

determining whether Pout is less than a predetermined threshold size;

responsive to determining that Pout is not less than the predetermined threshold size, determining Pout as a product of a number of turning points in each color value component of the output LUT, wherein a turning point is a point on a curve defined of grid points of the color value component of the output LUT where a slope of a tangent changes sign.

11. A non-transitory computer readable medium tangibly embodying programmed instructions which, when executed by a computer in an advanced function presentation (AFP) presentation device, perform a method comprising:
- obtaining an input ICC profile defining an input color space associated with presentation data in a data stream received for output at a presentation device;
- obtaining an output ICC profile defining an output color space of the presentation device;
- generating an input lookup table (LUT) from the input ICC profile the input LUT having a size (Pin), wherein the input LUT comprises color value components to provide for interpolation of pixel values from the input color space to an intermediate color space;
- generating an output LUT from the output ICC profile the output LUT having a size (Pout), wherein the output LUT comprises color value components to provide for interpolation of pixel values from the intermediate color space to the output color space;
- determining a preferred size of a Link LUT based on Pin and Pout; and
- generating the Link LUT having the preferred size for converting input data specified using the input color space to output data using the output color space,
- wherein the preferred size of the Link LUT is determined so as to reduce loss of accuracy in the Color Conversion and to reduce computational time in generating the Link LUT,
- wherein Pout is determined by performing the steps of:
- determining Pout as the product of a number of grid points in each color value component of the output LUT;
- determining whether Pout is less than a predetermined threshold size;
- responsive to determining that Pout is not less than the predetermined threshold size, determining Pout as the product of a number of turning points in each color value component of the output LUT, wherein a turning point is a point on a curve defined of grid points of the color value component of the output LUT where a slope of a tangent changes sign.

12. The non-transitory computer readable medium of claim 11 wherein Pin is determined by performing the steps of:
- for each color value component of the input LUT,
  - determining a first size value (n) as a number of grid points in said each color value component;
  - determining the a second size value (p) as a number of turning points in said each color value component, wherein a turning point is a point on a curve defined of grid points of the color value component of the input LUT where a slope of a tangent changes sign; and
  - determining a component size for said each component as the greater of n and p for said each color value component; and
- determining Pin as the product of the component size for each color value component of the input LUT.

13. The non-transitory computer readable medium of claim 11 wherein Pout is determined by performing the steps of:
- for each color value component of the output LUT,
  - determining a first size value (n) as a number of grid points in said each color value component;
  - determining the a second size value (p) as a number of turning points in said each color value component, wherein a turning point is a point on a curve defined of grid points of the color value component of the output LUT where a slope of a tangent changes sign; and
  - determining a component size for said each component as the greater of n and p for said each color value component; and
- determining Pout as the product of the component size for each color value component of the output LUT.

14. The non-transitory computer readable medium of claim 11 wherein Pin is determined by performing the steps of:
- determining Pin as the product of a number of grid points in each color value component of the input LUT;
- determining whether Pin is less than a predetermined threshold size;
- responsive to determining that Pin is not less than the predetermined threshold size, determining Pin as the product of a number of turning points in each color value component of the input LUT, wherein a turning point is a point on a curve defined of grid points of the color value component of the input LUT where a slope of a tangent changes sign.

15. The non-transitory computer readable medium of claim 11 wherein the step of determining the Link LUT size further comprises:
- comparing Pin and Pout;
- responsive to Pin being greater than or equal to Pout, using Pin as the Link LUT preferred size; and
- responsive to Pin being less than Pout, determining a preferred size $t^j$, wherein j is a number of components in the input LUT and t is $(Pout)^{1/j}$ rounded to the next highest integer.

* * * * *